United States Patent [19]

Iwasaki et al.

[11] Patent Number: 5,130,210

[45] Date of Patent: Jul. 14, 1992

[54] STABILIZED ZIRCONIA SOLID ELECTROLYTE AND PROCESS FOR PREPARATION THEREOF

[75] Inventors: Hiroyuki Iwasaki; Fumiya Ishizaki; Toshihiko Yoshida; Nobuaki Tagaya; Isao Mukaizawa; Hiroshi Seto, all of Saitama, Japan

[73] Assignee: Tonen Corporation, Tokyo, Japan

[21] Appl. No.: 571,861

[22] Filed: Aug. 24, 1990

[30] Foreign Application Priority Data

Aug. 25, 1989 [JP] Japan ................. 1-217539
Sep. 30, 1989 [JP] Japan ................. 1-253760

[51] Int. Cl.$^5$ .............................. H01M 6/18
[52] U.S. Cl. ........................ 429/33; 429/193; 501/105
[58] Field of Search ............ 429/33, 193; 252/62.2; 501/105

[56] References Cited

U.S. PATENT DOCUMENTS 4,365,011 12/1982 Bernard et al. .................. 429/193
4,857,165 8/1989 Ishiburo et al. .................. 204/124

OTHER PUBLICATIONS

Chemical Abstracts, vol. 110, Mar. 6, 1989, p. 753, abstract number 86 274s.
Chemical Abstracts, vol. 111, Jul. 10, 1989, pp. 595–596, abstract number 15 796y.

Primary Examiner—William R. Dixon, Jr.
Assistant Examiner—Chris Gallo
Attorney, Agent, or Firm—Wegner, Cantor, Mueller & Player

[57] ABSTRACT

The mechanical strength of stabilized zirconia is improved without lowering the ion conductivity by providing a solid electrolyte comprising stabilized zirconia and a metal oxide dispersed within grains or grain boundaries of stabilized zirconia, the metal oxide having an average submicron particle size and stabilized zirconia having an average particle size larger than 1 micron, typically larger than 10 μm or even 100 μm.

8 Claims, 1 Drawing Sheet

STABILIZED ZIRCONIA SOLID ELECTROLYTE AND PROCESS FOR PREPARATION THEREOF

BACKGROUND OF THE INVENTION

1. Field of the Invention

The present invention relates to a solid electrolyte, especially to a stabilized zirconia solid electrolyte, having an improved mechanical strength without a lowering of the oxygen ion conductivity, and a process for the preparation thereof.

2. Description of the Related Art

Stabilized zirconia is used as the electrolyte of a solid oxide fuel cell. In stabilized zirconia, a tetragonal zirconia phase (partially stabilized zirconia) is formed in the region where the amount of a stabilizer is small, and as the amount of the doped stabilizer is increased, a cubic zirconia phase (fully stabilized zirconia, hereinafter referred to as "stabilized zirconia") is formed. An element such as yttrium, cerium, calcium or magnesium is used as the stabilizer.

Both stabilized zirconia and partially stabilized zirconia have an oxygen ion conductivity, but stabilized zirconia has a higher ion conductivity, and stabilized zirconia has a superior stability at high temperatures. On the other hand, partially stabilized zirconia is a ceramics material having a very high strength and partially stabilized zirconia is much better than stabilized zirconia as a construction material. Accordingly, in industry, stabilized zirconia is used for an element having a small volume, for example, an oxygen sensor, in view of its electroconductivity, and partially stabilized zirconia is utilized for a pulverizing ball or a zirconia kitchen knife, in view of its strength.

In the case of a solid oxide fuel cell, to reduce the internal electric resistance of the cell, an electrolyte having a high oxygen ion conductivity is preferred, and the stabilized zirconia is generally used.

As the structure of the solid oxide fuel cell, there have been proposed a tubular structure and a planar structure. The tubular structure is constructed by the method in which a cell (electrolyte and electrodes) is supported on a porous ceramics supporting tube, and in this case, since self-supporting of the cell is not necessary, the required strength condition is not so strict. Nevertheless, since the volume of the support makes no contribution to the generation of electricity, a high integration is difficult.

In the case of the planar structure, since no support is disposed for the cell, a high integration is possible, but for the self-support of the cell, the strength condition required for the cell, especially the electrolyte, is very severe.

Accordingly, for the electrolyte of the planar solid oxide fuel cell, a utilization of partially stabilized zirconia or an increase of the strength by adding 5 to 30% by weight of an alumina powder to a stabilized zirconia powder as the starting material has been proposed.

When partially stabilized zirconia is used as the electrode, a problem arises in that the internal electric resistance of the cell is increased, compared with the internal electric resistance observed when stabilized zirconia is used. According to the method in which an alumina powder is added to a stabilized zirconia powder as the starting material, the strength of the solid electrolyte is improved, but since alumina is an insulating substance, a problem of a drastic reduction of the oxygen ion conductivity arises.

With this background, a primary object of the present invention is to provide a solid electrolyte in which the strength is improved without a lowering of the high ion conductivity of stabilized zirconia, and a process for the preparation thereof.

SUMMARY OF THE INVENTION

According to the present invention, this object is attained by a solid electrolyte comprising stabilized zirconia and a metal oxide contained therein, wherein the metal oxide is dispersed within grains of stabilized zirconia particles.

Furthermore, according to the present invention; there are provided a process for preparing a solid electrolyte, which comprises molding and firing a slurry of a stabilized zirconia powder supplemented with a metal alkoxide as the starting material; a process for preparing a solid electrolyte, which comprises molding and firing a slurry of stabilized zirconia and metal oxide powders as the starting material, said metal oxide powder having an average particle size smaller than 1 $\mu$m, and a process for preparing a solid electrolyte, which comprises dispersing a stabilized zirconia powder in a solution of a metal alkoxide or metal salt, carrying out hydrolysis and/or calcination to support a metal hydroxide or oxide on the stabilized zirconia powder, and molding and firing the obtained powder as the starting material.

In the fully stabilized zirconia solid electrolyte obtained according to the present invention, since a small amount of a metal oxide is present within grains and/or grain boundaries, to increase the strength of the fired body, the strength of the solid electrolyte can be improved without a lowering of the high ion conductivity of fully stabilized zirconia.

DESCRIPTION OF THE PREFERRED EMBODIMENTS

Figure 1:
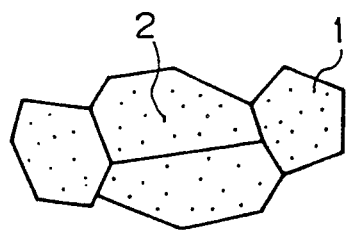
FIGS. 1 and 2 are schematical views of nano-composite structures of stabilized zirconia with metal oxide added according to the present invention; and, FIG. 3 is a schematical view of a micro-structure of stabilized zirconia supplemented with a metal oxide of the prior art.
Figure 2:
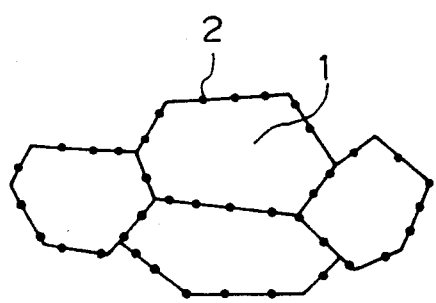
Figure 3:
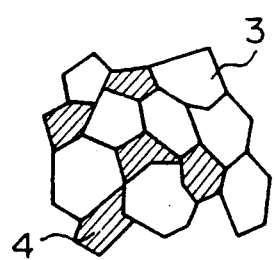

The solid electrolyte of stabilized zirconia has a nano-composite structure in which sintered stabilized zirconia grains have an average particle size larger than 1 $\mu$m and typically several multiples of ten to several multiples of one hundred $\mu$m, and metal oxide grains having an average size less than 1 $\mu$m (submicron) are dispersed within the stabilized zirconia grains and/or in the grain boundaries of the stabilized zirconia grains. FIGS. 1 and 2 illustrate the nano-composite structure of the stabilized zirconia of the present invention, in which 1 denotes stabilized zirconia grains and 2 denotes metal oxide grains. FIG. 3 illustrates a micro-structure of stabilized zirconia reinforced with alumina of the prior art, in which 3 denotes stabilized zirconia grains and 4 denotes alumina grains. By using a nano-composite structure, the mechanical strength of the stabilized zirconia is reinforced or improved without a lowering of the ion conductivity. It is considered that the ion conductivity of the stabilized zirconia of the present invention is not lowered because the size of the metal oxide in the stabilized zirconia is small, and further, the content of the metal oxide is small (FIGS. 1 and 2), in comparison with those of the stabilized zirconia reinforced with a metal oxide in the prior art (FIG. 3).

The fully stabilized zirconia of the present invention is zirconia stabilized by addition of about 5-10 mole %, particularly about 8 mole %, of a stabilizer, such as yttrium, cerium, calcium or magnesium.

The metal oxide that may be used in the present invention includes a first group of oxides that do not form a solid solution with the stabilized zirconia, for example, alumina, chromia and mullite, and a second group of oxides that form a solid solution with the stabilized zirconia, for example, magnesia, lime (alkaline earth metal oxides), rare earth metal oxides, titania, a bismuth oxide, thoria, urania, etc. and composite oxides thereof. When one of the second group of oxides is used in the present invention, the metal oxide is still in the form of grains dispersed in the stabilized zirconia grains, because of the production conditions. Nevertheless, such a metal oxide may be partially solid dissolved, particularly around the metal oxide grains.

The content of the metal oxide contained in the stabilized zirconia is preferably up to about 30% by weight, more preferably 0.01 to 20% by weight, particularly preferably 0.1 to 5% by weight, of the metal oxide-added stabilized zirconia. Advantageously, the addition of even a small content of the metal oxide increases the strength of the stabilized zirconia, but if the content of the metal oxide is too large, the ion conductivity of the stabilized zirconia is lowered.

The stabilized zirconia of the present invention may be produced by various methods.

According to the first method of making the metal oxide present within grains and/or in grain boundaries of stabilized zirconia, a metal alkoxide is added to a slurry of stabilized zirconia. A metal alkoxide represented by the formula of $M(OC_nH_{2n+1})_m$ in which M represents a metal element, n is typically an integer of from 1 to 4, and m represents the valency of the metal M, is preferably used as the metal alkoxide. Lower alcohols represented by the formula of $C_nH_{2n+1}OH$ in which n is an integer of from 1 to 4, and aromatic organic solvents such as benzene or toluene, can be used as the solvent or dispersion medium. Furthermore, customary additives such as a binder, a dispersant, a defoaming agent and a plasticizer can be added to the slurry.

The stabilized zirconia powder in the slurry preferably has an average submicron particle size, i.e., less that 1 $\mu$m, although powder having an average particle size of several micro meters or more also may be used. A smaller stabilized zirconia powder is preferable, to obtain a denser sintered body.

Molding and firing of the stabilized zirconia slurry can be accomplished according to conventional procedures. For example, firing is carried out in an oxygen-containing atmosphere at 1500°-1600° C. for about 4-8 hours.

According to the second method of making the metal oxide present within grains and/or in grain boundaries of stabilized zirconia, a slurry of stabilized zirconia and metal oxide powders is formed, followed by molding and firing the slurry. The stabilized zirconia powder and the solvent or medium may be same as in the first method. The metal oxide powder should have a submicron particle size i.e., less than 1 $\mu$m. The molding and firing can be accomplished according to conventional procedures. The metal oxide particle to be added may be a complex oxide or solid solution such as ceria doped with a rare earth metal oxide (e.g., $Y_2O_3$, $Sm_2O_3$, $Gd_2O_3$), an alkaline earth metal oxide (e.g., MgO, Cao) or other metal oxide (e.g., $TiO_2$, $Bi_2O_3$); or zirconia doped with a rare earth metal oxide, an alkaline earth metal oxide or other metal oxide, etc. These complex oxides, particularly doped ceria, are preferable because they have an ion conductivity, and thus do not lower the ion conductivity of the stabilized zirconia so much, in comparison with the simple metal oxide such as ceria alone or yttria alone.

According to the third method of making the metal oxide present within grains of stabilized zirconia, stabilized zirconia particles are dispersed in a solution of a metal alkoxide or metal salt, the hydrolysis is then carried out, the reaction solution is filtered, the recovered solid is washed and dried to support the metal component in the form of a hydroxide on the stabilized zirconia particles, the calcination is carried out according to need to convert the supported metal hydroxide to a metal oxide by thermal decomposition, and the obtained stabilized zirconia particles are molded and fired. Also in this method, solvents as described above can be used as the solvent for the metal alkoxide. As the metal salt, there can be mentioned a nitrate, a chloride, a carbonate and an acetate. In this case, water, a lower alcohol or a glycol can be used as the solvent. The hydrolysis is effected by dropping or incorporating a solution of an alkali metal hydroxide, ammonia or a basic amine in a solvent as mentioned above according to customary procedures.

The obtained stabilized zirconia particles adhere on the surface thereof the metal component in the form of a fine hydroxide or oxide. Molding and firing of the stabilized zirconia particles can be accomplished according to customary procedures.

According to the first and third methods of the present invention, since zirconia particles are thinly and uniformly covered with the metal alkoxide or metal salt in the form of a solution, if the metal alkoxide or metal salt is hydrolyzed or thermally decomposed, the metal oxide can be more uniformly dispersed at a lower metal oxide ratio than in the conventional method in which a mixture of a zirconia powder and a metal oxide (e.g. alumina) powder is dispersed. Since the metal oxide particles present in grains or grain boundaries are very small, the influence of the metal oxide particles on the oxygen ion conductivity of zirconia is very slight. Even if the amount of the metal oxide in the stabilized zirconia electrolyte is small, e.g., 0.1% by weight, an effect of improving the strength is manifested.

EXAMPLES

EXAMPLE 1

To 50 cc of toluene was added 4.085 g of aluminum isopropoxide (MW=204.25), and the mixture was stirred to completely dissolve the aluminum isopropoxide. Separately, 100 g of full stabilized zirconia (8YSZ) powder containing 8 mole % of $Y_2O_3$ (yttria) as a stabilizer (TZ-8Y supplied by Toso; average particle size=0.3 $\mu$m) was weighed, 50 cc of isopropanol was added thereto, and the mixture was stirred and dispersed by a ball mill. Then, the above-mentioned solution of aluminum isopropoxide in toluene, 10 g of polyvinyl butyral (PVB) powder and small amounts of a dispersant, a defoaming agent and a plasticizer were added to the dispersion, and the mixture was further stirred and dispersed by a ball mill. The formed slurry was vacuum-defoamed and a green sheet was formed by a doctor blade device, and a ceramics fired sheet was obtained through punching and firing. The fired body had a thickness of about 200 μm. The binding strength, conductivity, and fuel cell performance are shown in the Table 1 given hereinafter.

The bending strength was determined by preparing 10 specimens having sizes of 3 mm×40 mm×0.2 mm with a size tolerance of 10% m, carrying out the three points bending test at spans of 30 mm. The cell performance was determined by forming respectively an anode (a paste of a mixture of Ni and yttria stabilized zirconia with 9:1 weight ration) and a cathode (a paste of $La_{0.9}SR_{0.1}MnO_3$) on the surfaces of the specimen, applying a platinum screen for collecting the electric current, and flowing pure hydrogen as a fuel and pure oxygen as an oxidizing agent at a flow rate of 100 cc/min respectively, whereat the output at a constant current of 1 A was measured. The electric conductivity was the value in the air at 1000° C. for a specimen with an electrode made of a platinum paste having an area of 0.5 $cm^2$ and with a current collector of a plutinum screen.

When the fired body was observed by a transmission electron microscope, it was found that alumina particles were present within stabilized zirconia particles. Some alumina particles were present in grain boundaries of the zirconia particles.

EXAMPLE 2

In the same manner as described in Example 1, 8.17 g of aluminum isopropoxide was dissolved in 100 cc of toluene, and 100 g of yttrium-stabilized zirconia (YSZ) powder was dispersed in the solution to form a slurry. Separately, 5 g of pure water and a minute amount of aqueous ammonium were mixed with isopropanol so that the total volume was 100 cc. The formed liquid was gradually dropped into the slurry to effect hydrolysis. The reaction liquid was filtered, and the recovered solid was dried and the obtained powder was calcined at 600° C. to obtain an alumina-supported YSZ powder.

To the obtained powder were added 50 cc of toluene, 50 cc of isopropanol, 10 g of polyvinyl butyral (PVB) and small amounts of a dispersant, a defoaming agent and a plasticizer, and the mixture was stirred and dispersed by a ball mill. A sheet was formed by a doctor blade device, and the sheet was fired. The strength and cell performance of the fired body are shown in Table 1 given hereinafter. The performance of the obtained fired body were almost equal to those of the fired body obtained in Example 1.

The bending strength was determined by preparing 10 specimens having sizes of 3 mm×40 mm×0.2 mm with a size tolerance of 10% m carrying out the three points bending test at spans of 30 mm. The cell performance was determined by forming respectively an anode (a paste of a mixture of Ni and yttria stabilized zirconia with 9:1 weight ration) and a cathode (a paste of $La_{0.9}SR_{0.1}MnO_3$) on the surfaces of the specimen, applying a platinum SCREEN for collecting the electric current, and flowing pure hydrogen as a fuel and pure oxygen as an oxidizing agent at a flow rate of 100 cc/min respectively, whereat the output at a constant current of 1 A was measured. The electric conductivity was the value in the air at 1000° C. for a specimen with an electrode made of a platinum paste having an area of 0.5 $cm^2$ and with a current collector of a platinum screen.

When the fired body was observed by a transmission electron microscope, it was found that alumina particles were present within stabilized zirconia particles. Some alumina particles were present in grain boundaries of the zirconia particles.

Comparative Examples 1 and 2

A slurry was prepared in the same manner as described in Example 2 except that partially stabilized zirconia containing 3 mole % of yttria as the stabilizer (3YSZ, average particle size=0.3 μm) or full stabilized zirconia containing 8 mole % of yttria as the stabilizer (8YSZ, average particle size=0.3 μm) was used instead of the alumina-supported YSZ powder, and molding and firing were carried out.

The properties of the fired body are shown in the table given hereinafter.

Comparative Examples 3 through 5

Alumina powder (TM-DR supplied by Taimei Kagaku; average particle size=0.2 μm) was added in an amount of 10% by weight, 20% by weight or 30% by weight to the full stabilized zirconia (8YSZ) used in Comparative Example 2, and a fired body was formed in the same manner as described in Example 2.

The properties of the obtained fired body are shown in the table given hereinafter.

EXAMPLE 3

To 50 cc of isopropanol was added 7.35 g of aluminum nitrate (MW=375.13), and the mixture was sufficiently stirred to completely dissolve the aluminum nitrate.

Separately, 100 g of full stabilized zirconia (8YSZ) powder containing 8 mole % of $Y_2O_3$ (yttria) as the stabilizer (RZ-8Y supplied by Toso; average particle size=0.3 μm) was weighed, and 40 cc of toluene and 20 cc of isopropanol were added thereto. The mixture was stirred and dispersed by a ball mill. To the dispersion were added the above-mentioned isopropanol solution of aluminum nitrate, 10 g of polyvinyl butyral (PVB) and small amounts of a dispersant, a defoaming agent and a plasticizer, and the mixture was further stirred and dispersed by a ball mill. A sheet was formed by a doctor blade device. Molding and firing were carried out in the same manner as described in Example 1.

When the obtained fired body was observed by a transmission microscope, it was found that alumina particles were present within stabilized zirconia particles.

Some alumina particles were present in grain boundaries of the zirconia particles.

The properties of the obtained fired body are shown in the Table given hereinafter.

TABLE 1

| Fired Body | Strength (kgf/mm$^2$) | Cell Output (W/cm$^2$) | Resistance (Scm$^{-1}$) |
|---|---|---|---|
| Comparative Example 1, 3YSZ alone | 76 | 0.7 | 0.05 |
| Comparative Example 2, 8YSZ alone | 26 | 2.8 | 0.15 |
| Comparative Example 3, 8YSZ/Al$_2$O$_3$ powder mixture (9/1) | 32 | 2.2 | 0.12 |
| Comparative Example 4, 8YSZ/Al$_2$O$_3$ powder mixture (8/2) | 37 | 1.9 | 0.10 |

TABLE 1-continued

| Fired Body | Strength (kgf/mm²) | Cell Output (W/cm²) | Resistance (Scm⁻¹) |
|---|---|---|---|
| Comparative Example 5, 8YSZ/Al$_2$O$_3$ powder mixture (7/3) | 43 | 1.5 | 0.08 |
| Examples 1 and 2, 8YSZ/Al$_2$O$_3$ = 100/1, alkoxide method | 36 | 2.6 | 0.14 |
| Example 3, 8YSZ/Al$_2$O$_3$ = 100/1, aluminum nitrate method | 37 | 2.7 | 0.14 |

Note
1) The strength is the mean value of the three-point bending strength determined at a sample thickness of 200 μm (±20 μm).
2) The cell output is obtained upon an application of a current of 1 A, when pure hydrogen and pure oxygen were supplied to an electrode area of 0.5 cm².
3) The resistance is a bulk resistance value obtained at 1000° C. by complex impedance method.

EXAMPLES 3-7

To 50 cc of toluene was added total 100 g of fully stabilized zirconia (8YSZ) powder containing 8 mole % of Y$_2$O$_3$ (yttria) as a stabilizer (TZ-8Y supplied by Toso; average particle size=0.3 μm) and a metal oxide shown in Table 2 in a weight ration shown in Table 2, and the mixture was stirred and dispersed by a ball mill. Then, 10 g of polyvinyl butyral (PVB) powder and small amounts of a dispersant, a defoaming agent and a plasticizer were added to the dispersion, and the mixture was further stirred and dispersed by a ball mill. The formed slurry was vacuum-defoamed and a green sheet was formed by a doctor blade device, and a ceramic fired body was obtained through punching and firing at 1400° C. for a 8 hours. The fired body had a thickness of about 200 μm.

The bending strength, electric conductivity and fuel cell performance were measured in the same manners as described in Example 1 and are shown in Table 2.

TABLE 2

| Added oxide (added ratio) | bending [kgf/mm²] | Electric conductivity | Cell output [W/cm²] |
|---|---|---|---|
| 8YSZ | 23 | 0.15 | 1.4 |
| 8YSZ:(YO$_{1.5}$)$_{0.15}$(CeO$_2$)$_{0.85}$ ≈ 9:1 | 28 | 0.14 | 1.1 |
| 8YSZ:(CeO$_2$)$_{0.12}$(ZrO$_2$)$_{0.88}$ ≈ 9:1 | 35 | 0.11 | 1.0 |
| 8YSZ:(MgO)$_{0.09}$(ZrO$_2$)$_{0.91}$ ≈ 9:1 | 32 | 0.10 | 1.0 |
| 8YSZ:CeO$_2$ = 99:1 | 27 | 0.13 | 1.2 |
| 8YSZ:MgO = 99:1 | 28 | 0.12 | 1.0 |

What is claimed is:

1. A solid electrolyte comprising stabilized zirconia and a metal oxide contained therein, wherein the metal oxide is dispersed within grains and/or in grain boundaries of stabilized zirconia particles, wherein the zirconia particles have an average particle size of 3 to 20 μm and a particle size of at least 90% of the metal oxide particles is within a range of 0.1 to 0.5 μm.

2. A solid electrolyte according to claim 1, wherein said stabilized zirconia is zirconia stabilized by addition of about 5-10 mole % of at least one stabilizer selected from the group consisting of yttrium, cerium, calcium and magnesium.

3. A solid electrolyte according to claim 2, wherein said stabilized zirconia is zirconia stabilized by addition of about 8 mole % of at least one stabilizer selected from the group consisting of yttrium, cerium, calcium and magnesium.

4. A solid electrolyte according to claim 1, wherein said metal oxide is at least one selected from the group consisting of alumina, chromia, mullite, magnesia, lime, rare earth metal oxide, titania, bismuth oxide, thoria, urania and composite oxides thereof.

5. A solid electrolyte according to claim 4, wherein said metal oxide is at least one selected from the group consisting of alumina, chromia and mullite.

6. A solid electrolyte according to claim 4, wherein said metal oxide is at least one selected from the group consisting of magnesia, calcia, rare earth metal oxide, titania, ceria, bismuth oxide, thoria, urania and composite oxide thereof.

7. A solid electrolyte according to claim 4, wherein said metal oxide is at least one of metal oxide-doped ceria and zirconia.

8. A solid electrolyte according to claim 1, wherein said metal oxide is contained in an amount of about 0.1 to 5% by weight.

* * * * *